April 29, 1958  M. MORSE  2,832,616
ROTARY SHAFT SEAL
Filed Jan. 3, 1955

United States Patent Office 2,832,616
Patented Apr. 29, 1958

2,832,616
ROTARY SHAFT SEAL
Milton Morse, New York, N. Y.
Application January 3, 1955, Serial No. 479,410
2 Claims. (Cl. 286—7)

This invention relates generally to moisture sealing devices, and more particularly to an improved resilient moisture-proof structure adapted to prevent the entry of fluids such as air, and water vapor into electrical devices having a movable operating element, as for example, switches of a type in which the circuit is opened and closed by means of a rotating shaft. This application is a continuation in part of my copending application, Serial No. 354,052, filed May 11, 1953, now Patent Number 2,795,144.

In various communications equipment, there is usually a large number of rotary-type switches which are mounted through a solid panel encasing the equipment. These switches are vulnerable to the effects of air, moisture and/or liquids, and where the equipment is mounted on aircraft vehicles, or vessels, into which water or gas may penetrate, the equipment would be rendered useless.

It is therefore among the principal objects of the present invention to provide hermetic sealing devices which are capable of engaging and partially enclosing the exposed parts of electrical rotating type switches, or the like, which will protect the equipment by preventing fluids from entering the casing surrounding the equipment at the area of connection between the device and the casing.

Another object of the present invention lies in the provision of water-proofing structure, which may be expediently installed and removed as a single unit, and without the use of special tools or skills.

Another object of the invention lies in the provision of moisture-proofing structure adapted to be fitted about a rotating-type switch which includes resilient and annular components, which may be partially distorted to completely seal the passage of fluids past the annular juncture of the operating shaft and the solid panel through which it projects, and which will nevertheless provide no interference with normal operations of the switch.

A feature of the invention lies in the fact that the device may be installed upon or removed from a mounted toggle switch by using only the fingers of the hand, or if a particularly tight fit is required, by means of an ordinary socket wrench.

Another feature of the invention lies in the fact that the metal and resilient parts comprising the device are formed by molding the latter about the former, thereby forming a unit which is not easily damaged or torn apart.

The invention is useful in maintaining a substantially vapor-proof seal about switches associated with hermetically sealed cabinets.

At high altitudes in aircraft and rockets, the present device prevents reverse leakage of the gas normally under pressure in the equipment cabin, thus preventing reduction of pressure with consequent arcing and explosion of condensers.

These objects and features, as well as other incidental ends and advantages, will become more clearly apparent during the course of the following disclosure, and be pointed out in the appended claims.

On the drawing, to which reference will be made in the specification, similar reference characters have been employed to designate corresponding parts throughout the several views.

Figure 1:
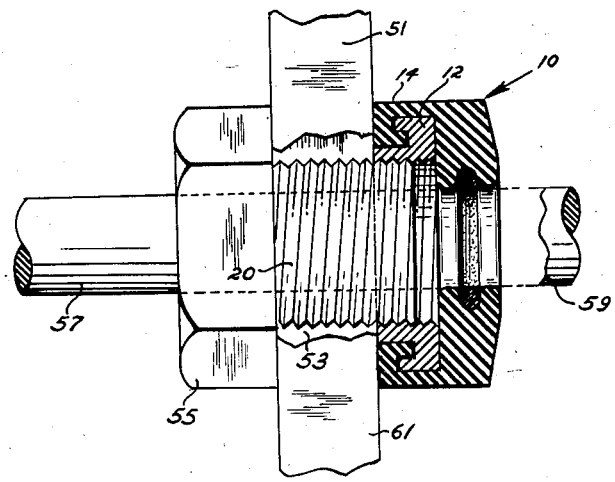
Figure 1 is a view in elevation, partly in section, of an embodiment of the invention.

In accordance with the invention, the device, generally indicated by reference character 10, comprises broadly: a nut element 12, and a boot element 14.

Figure 4:
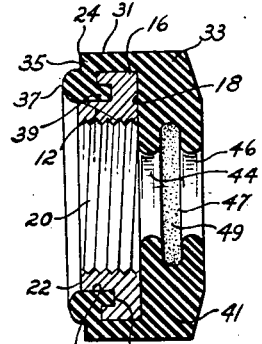
Figure 4 is a longitudinal central sectional view of the embodiment.
Figure 2:
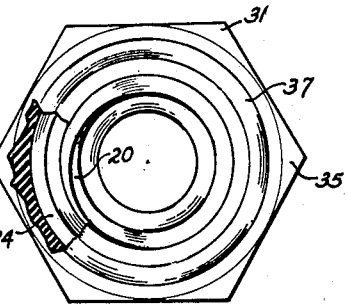
Figure 2 is an end elevational view, partly broken away to show detail.
Figure 5:
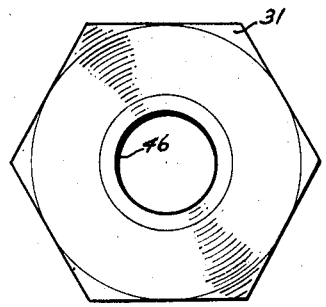
Figure 5 is a second end elevational view.
Figure 3:
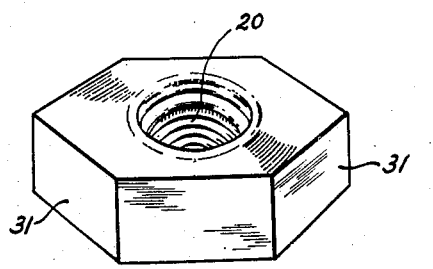
Figure 3 is a view in perspective of the embodiment.

The nut element 12 is preferably formed from machined brass or other suitable metal. It is of irregular configuration, best seen on Figures 1 and 4, and being bounded by an outer peripheral edge 16, an outer planar surface 18, a threaded bore 20, an inner edge 22, an inner peripheral surface 23, which with a projecting flange 24, forms a groove 26 to provide means for securing the boot element 14 about the nut element 16.

The boot element 14 includes a nut-enclosing member 31 upon which there is integrally formed a resilient deformable member 33.

The nut-enclosing member is molded directly upon the nut element 12, and includes an outer peripheral portion 35 having a compressible portion 37 thereon, and a flange portion 39, adapted to engage the groove 26 on the nut element 12.

The deformable member 33 includes a resilient body portion 41, from which extend a pair of annular ribs 44 and 46 separated by a groove 47 in which there may be disposed a suitable lubricant 49.

Referring to Figure 1, there may be seen a typical installation upon a piece of equipment, the equipment including a plate 51 which forms a part of a casing (not shown) in which the equipment is disposed. A threaded bushing 53 extends through an opening in the plate, to engage the threads of a conventional nut 55. A shaft 57 extends through a coaxial through opening in the bushing, and is connected with a switch or other element of the equipment, a portion indicated by reference character 59 extending outwardly of the plate 51 to be manually or otherwise rotatable.

The threaded bore 20 of the nut element 12 is threadedly engaged upon the bushing 53 in such manner that the compressible portion 37 is brought into contact with the outer surface 61 of the plate 51. Upon tightening the device with respect to the bushing, the compressible portion 37 will be further deformed to create a vapor proof seal between the plate 51 and the device 10.

The shaft 57 projects through the opening formed by the ribs 44 and 46, and a hermetic seal is obtained by virtue of the fact that the external diameter of the shaft 57 is slightly greater than the internal diameter of the opening formed by the ribs 44 and 46, engagement of the former with the latter serving to slightly expand them. As the lubricant 49 disposed within the groove 47 contacts a portion of the cylindrical outer surface of the shaft 57, no moisture or air passes the seal formed at this point.

Owing to the fact that a small amount of lubricant will naturally spread by capillary action to the ribs 44 and 46, the shaft 57 is lubricated with respect to the ribs. This lubrication permits intermittent speeds as high as one thousand revolutions per minute without damage to either shaft or ribs, while nevertheless maintaining an effective seal therebetween.

Owing to the fact that the boot element 14 is formed from a molded relatively impervious resilient material, as for example silicon rubber, effective sealing is accomplished while completely eliminating twisting, rolling or gapping in operation. Backlash, that is the tendency of the shaft to return to its initial position after release at the end of rotational motion, is eliminated by using a relatively hard rubber, and relatively light pressure against the shaft. This creates practically no friction, and static friction is completely eliminated by the lubricant disposed in the groove between the ribs.

For particular applications, the boot element may be formed from materials other than silicon rubber, as for example various vinyl compounds adapted to withstand the deleterious effects of unusually high or low temperatures, acids, alkalies and the like.

Where it is desired that the shaft which projects through the device be maintained in a relatively fixed position, the lubricant may be replaced by powdered resin or a pressure sensitive adhesive which will maintain a given setting within a relatively short period of time, which may be dislodged to permit a new setting.

The device may be hand-tightened to provide absolute hermetic sealing in normal installations. For production applications, a hexsocket wrench may be used.

I wish it to be understood that I do not consider the invention limited to the exact details of structure shown and set forth in this specification, for obvious modifications will occur to those skilled in the art to which the present invention pertains.

I claim:

1. A pressure sealing device comprising: a metallic nut element having an internal threaded bore having first and second ends and a principal axis, a boot element of resilient material completely enclosing said nut element with the exception of said first end and said threaded bore, said boot element having first and second sealing means; said first sealing means including an annular portion compressible in a direction parallel to said axis and surrounding said first end of said threaded bore, said second sealing means including an annular body of resilient material disposed at said second end of said threaded bore and having an annular rib extending radially inwardly and lying in a plane perpendicular to said axis of said bore and forming an opening which partially overlies said second end of said bore.

2. A pressure sealing device comprising: a metallic nut element having an internal threaded bore having first and second ends and a principal axis, a boot element of resilient material completely enclosing said nut element with the exception of said first end and said threaded bore, said boot element having first and second sealing means; said first sealing means including an annular portion compressible in a direction parallel to said axis and surrounding said first end of said threaded bore, said second sealing means including an annular body of resilient material disposed at said second end of said threaded bore and having a pair of annular ribs extending radially inwardly and disposed in parallel planes each perpendicular to said principal axis of said bore.

References Cited in the file of this patent

UNITED STATES PATENTS

| | | |
|---|---|---|
| 469,830 | Cain | Mar. 1, 1892 |
| 896,204 | Glauber | Aug. 18, 1908 |
| 1,249,572 | Weitling | Dec. 11, 1917 |
| 1,510,806 | Snider | Oct. 7, 1924 |
| 2,568,056 | Corder | Sept. 18, 1951 |
| 2,700,774 | Smith | Feb. 1, 1955 |